United States Patent
Suzuki et al.

(10) Patent No.: US 6,430,217 B1
(45) Date of Patent: Aug. 6, 2002

(54) NOISE ELIMINATED DIGITAL WIRELESS TRANSCEIVER APPARATUS

(75) Inventors: Katsuya Suzuki; Hiroshi Nakagiri, both of Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/247,076

(22) Filed: Feb. 9, 1999

(30) Foreign Application Priority Data

Feb. 16, 1998 (JP) .......................................... 10-032764

(51) Int. Cl.[7] .............................................. H04B 1/38
(52) U.S. Cl. ....................... 375/219; 375/130; 375/296; 375/346; 455/568
(58) Field of Search ................................ 375/130, 219, 375/286, 285, 346, 296; 455/568, 569, 550, 73

(56) References Cited

U.S. PATENT DOCUMENTS

| | | | |
|---|---|---|---|
| 5,191,602 A | * 3/1993 | Regan et al. | ................ 455/568 |
| 5,200,720 A | * 4/1993 | Yi | ............................... 333/181 |
| 5,557,653 A | * 9/1996 | Paterson et al. | ............ 455/568 |

* cited by examiner

Primary Examiner—Stephen Chin
Assistant Examiner—Chieh M. Fan
(74) Attorney, Agent, or Firm—Rabin & Berdo, P.C.

(57) ABSTRACT

A speech voice input to the microphone 62 is converted into a digital signal by an A/D converter 35. An encoder 36 in turn spreads the digital signal using a spread spectrum scheme and the spread signal is supplied to the modulator 37. A modulator 37 modulates a carrier wave (e.g., a frequency of 800 MHz) with the spread signal and the modulated wave is transmitted from an antenna 40. A high-frequency signal is induced in a paired cable 64 of a headset 60 by the transmitted wave. The high-frequency signal transferred in the direction to the telephone unit 30 through the cable 64 is eliminated by an LPF 46. On the other hand, the high-frequency signal transferred to a headphone 61 passes through a capacitor 63 to a ground level. Thus, the entry of the transmitted signal into the amplifier 45 and the headphone 61 can be avoided, and an occurrence of noise in the headphone 61 can be prevented.

3 Claims, 4 Drawing Sheets

NOISE ELIMINATED DIGITAL WIRELESS TRANSCEIVER APPARATUS

BACKGROUND OF THE INVENTION

1. Field of the Invention

The present invention generally relates to a digital wireless transceiver apparatus, in particular, to a portable telephone device.

2. Description of the Related Art

FIG. 1 illustrates an external view of a conventional portable telephone device. The portable telephone device comprises a telephone unit 10 and a headset 20. The headset 20 may be optionally coupled to the unit 10. The unit 10 includes a telephone housing 11 and an antenna 12 that can be pulled out from the housing 11. A built-in earphone 13, a built-in microphone 14, operation keys 15, a display 16, and a transceiver section 17 that is hidden by the housing 11 are installed in the telephone unit 10. The housing 11 has a jack 18 for coupling the headset 20.

The headset 20 comprises a plug 21 for coupling with the jack 18, a headphone 22 corresponding to the earphone 13, a headset microphone 23 corresponding to the built-in microphone 14 and a paired cable 24 for connecting the headphone 22 and the headset microphone 23 to the unit 10.

Generally, portable telephones of this kind are designed for being used with an earphone 13 and a built-in microphone 14, being held in a hand, without using a headset 20. However, the telephones are designed for being used optionally with the headset 20 so as to avoid such a danger that the driver of a motor vehicle holds a telephone unit 10 while driving the vehicle.

When the headset 20 is to be used, the plug 21 should be inserted into the jack 18 of the telephone unit 10. The insertion causes the earphone 13 and the built-in microphone 14 to be disconnected from the transceiver section 17 while the headphone 22 and the headset microphone 23 are connected to the transceiver section 17, thereby enabling a use of the telephone unit 10 without holding it in a hand.

When, however, the headphone 22 is used for a digital portable telephone, a problem has been accounted, as follows. The conventional analog portable telephone transmits a radio wave with a constant amplitude during a telephone call. On the other hand, a digital portable telephone is adapted to sample an analog voice signal generated during a call is sampled with a fixed period of time for converting it into a digital signal. The thus resulted digital signal is temporarily stored in a buffer memory. The stored digital signal is spread with spread codes in a spread spectrum scheme and converted into a fast digital radio signal of, for example, 800 MHz for transmission through the antenna 12. In this instance, it is to be noted that the radio signal may be intermittently transmitted as a burst-mode signal under some conditions, for example, in the case of presence or absence of a voice signal to be transmitted or in the case of the line congestion.

When the headset 20 is connected the digital portable telephone, the radio wave of 800 MHz intermittently transmitted through the antenna 12 of the telephone unit 10 is caught by the cable 24 of the headset 20. The caught radio wave is interrupted with a low frequency component of, for example, several hundred Hz. to particular low frequency depends on a period of on/off control for the transmission of the radio wave. The burst signal may enter a voice amplifier in a receiver channel of the transceiver unit 17, or may be detected by the headphone 22, thereby causing noises with a frequency of several hundreds Hz in the headphone 22. Owing to the noise output from the headphone 22, the clarity of a caller voice will be significantly degraded. As such, there arises such a problem that the effective use of the headphone 22 is impaired.

OBJECT AND SUMMARY OF THE INVENTION

It is an object of the present invention to provide a digital wireless transceiver such as a digital portable telephone device which is free from noises occurring in a headset that is connected thereto.

The foregoing and other problems are overcome and the object of the invention is realized by apparatus in accordance with the invention.

The present invention provides in a first aspect, a digital wireless transceiver apparatus having transmitting means for converting a voice signal into a digital signal to store the converted signal and f or modulating a carrier wave with spread spectrum codes of the stored signal, the transmitting means being operable f or transmitting the modulated signal in an intermittent mode; receiving means for receiving a spread radio signal for demodulating the received signal to obtain a voice signal; acoustic means for converting the voice signal into an acoustic sound; and transfer means for transferring the voice signal to the acoustic means through a cable; wherein the transfer means comprising: a first high-frequency eliminating means for preventing a high-frequency signal induced in the transfer means by the transmitted signal from arriving at the acoustic means.

Further, a digital wireless transceiver apparatus in a second aspect of the present invention is characterized by the transfer means further includes a second high-frequency eliminating means for preventing the high-frequency signal from arriving at the receiving means.

Still further, a digital wireless transceiver apparatus according to claim 2, wherein the transfer means includes a detachable coupler for relaying the voice signal between the receiving means and a paired cable interconnecting the coupler and the acoustic means, wherein the second high-frequency eliminating means being provided between the coupler and the paired cable.

DETAILED DESCRIPTION OF EMBODIMENTS

First Embodiment

Figure 1:
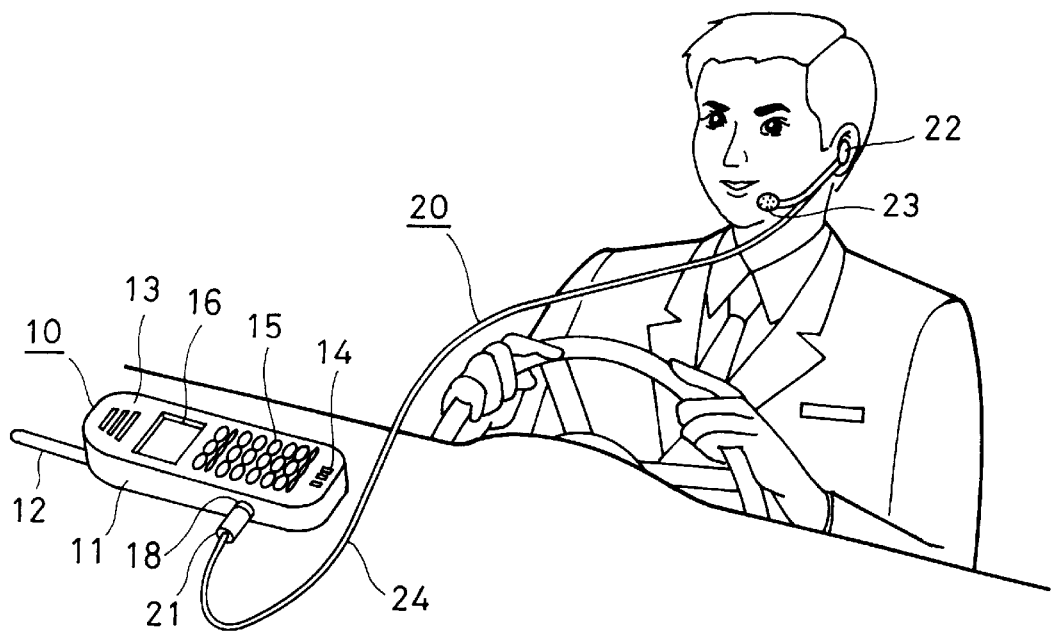
FIG. 1 is a view showing the inside of a vehicle cabin in which a portable telephone unit is placed and a driver is seated while wearing a headset, the headset being connected to the telephone unit by a paired cable.
Figure 2:
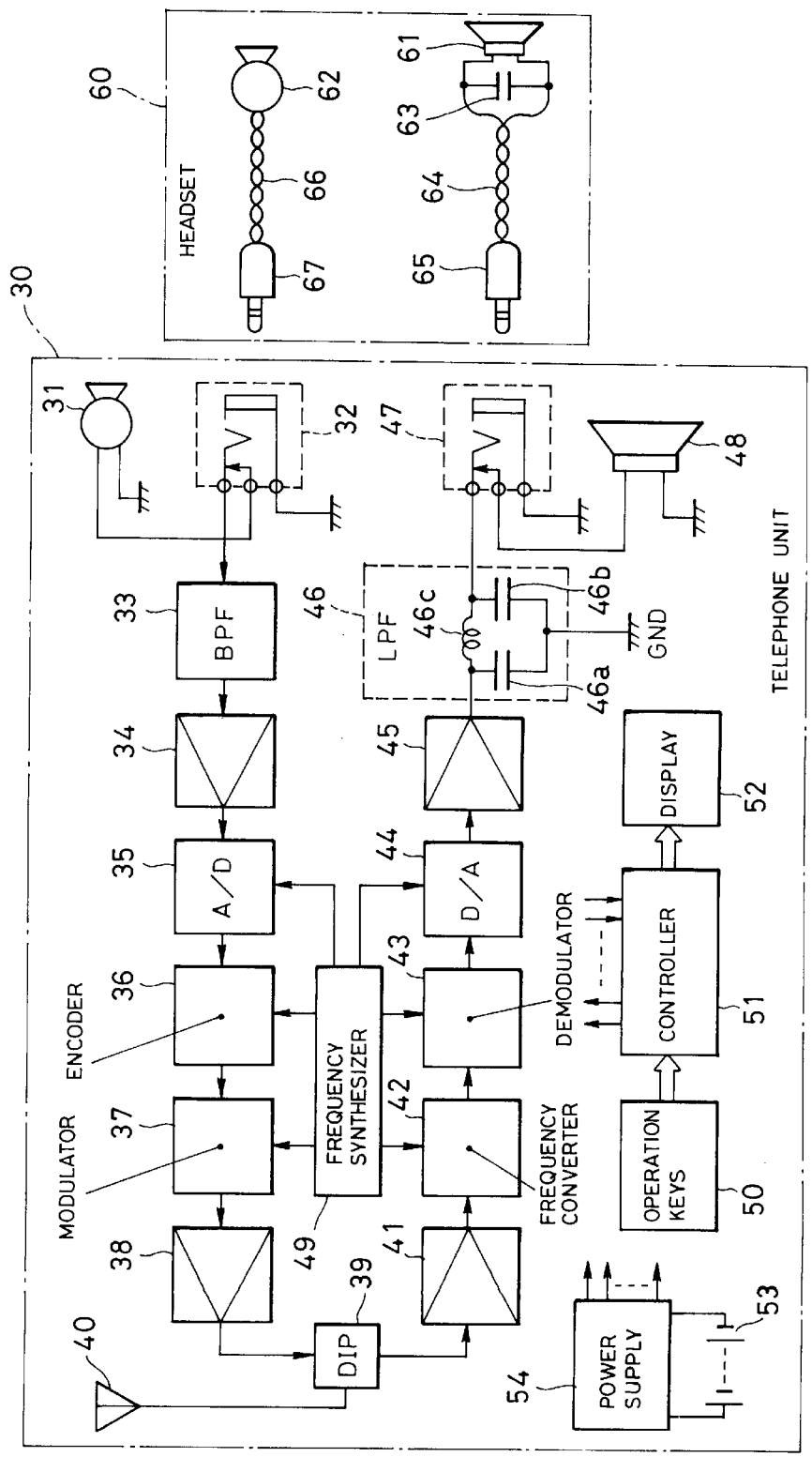
FIG. 2 is a block diagram illustrating the configuration of a digital portable-telephone device of a first embodiment according to the present invention.

FIG. 2 shows a block diagram illustrating the configuration of a digital portable-telephone device of a first embodiment according to the present invention. The portable-telephone device comprises a telephone unit 30 and a headset 60. The headset 60 can be optionally coupled to the unit 30.

The unit 30 has a transmitting means and a receiving means in the housing 11. The transmitting means includes, for example, a built-in microphone 31, a microphone jack 32, a bandpass filter (hereinafter referred to as the "BPF"), a voice amplifier 34, an analog-to-digital converter 35 (hereinafter referred to as the "A/D converter"), an encoder 36, a modulator 37, a transmit-power amplifier 38, a diplexer 39, and an antenna 40.

The built-in microphone 31 converts a speech voice into an electronic signal. The electronic signal output from the microphone 31 is then supplied to the BPF 33 via a microphone jack 32. The jack has a switch portion, which connects an external microphone to the input terminal of the BPF 33 while disconnects the built-in microphone 31. The BPF 33 allowes frequency components within a speech band (e.g., 300 Hz–3 kHz) to pass therethrough, while rejects frequency components outside the band. The voice amplifier 34 amplifies the electronic signal and supplies the amplified signal, that is an analog voice signal, to the A/D converter 35. The A/D converter 35 converts the analog voice signal into a digital signal. The encoder 36 temporarily stores the digital signal supplied from the A/D converter 35. The encoder 36 encodes the stored digital signal using the spread spectrum scheme for supplying the resulted digital codes to the modulator 37.

The modulator 37 performs a digital modulation of a carrier signal (e.g., 800 MHz) with the digital codes and supplies the modulated signal to the transmit-power amplifier 38. The amplifier 38 amplifies the digital-modulated signal to a predetermined power level. The amplified digital signal output from the amplifier 38 is transmitted over the antenna 40 by way of the diplexer 39. The antenna 40 may also serve for the reception of the radio signals.

The receiving means comprises, for example, the antenna 40, the diplexer 39, a high-frequency amplifier 41, a frequency converter 42, a demodulator 43, a digital-to-analog converter 44 (hereinafter referred to as the "D/A converter"), and an audio power amplifier 45.

The radio signal received by the antenna 40 is supplied to the high-frequency amplifier 41 through the diplexer 39. The high-frequency amplifier 41 amplifies the received signal to a predetermined power level without changing the frequency of the signal. The frequency converter 42 has a function of converting the frequency of the amplified signal so as to select a signal of a desired frequency.

The demodulator 43 extracts a signal from the converted signal for demodulating it into a baseband digital signal. The D/A converter 44 converts the digital signal into an analog voice signal. The audio power amplifier 45 amplifies the voice signal for generating an audio signal. A high-frequency elimination means, for example, a low-pass filter (hereinafter referred to as the "LPF") is connected to the output terminal of the amplifier 45.

The LPF 46 has a π-shape configuration of capacitors 46a, 46b and an inductor 46c. For example, both of the capacitors 46a, 46b may be of 100 pF, and the inductor 46c may be of 120 nH. The LPF 46 allows the frequency components within a speech band to pass therethrough without causing a substantial loss, while the high-frequency carrier components of 800 MHz band to bypass to a ground level. The output terminal of is connected to a built-in earphone 48 installed in the housing 11 by way of a switching portion of a coupling means, for example, a headphone jack 47, for coupling an external headphone.

The unit 30 includes a frequency synthesizer 49 that generates transmit/receive frequencies and various kinds of clock signals from a reference frequency. The synthesizer 49 supplies the signals of required frequency for the respective device sections, i.e., the A/D converter 35, the encoder 36, the modulator 37, the converter 42, the demodulator 43, and the D/A converter 44.

Furthermore, the unit 30 includes operation keys 50 for calling out/in operation, a controller 51 for controlling the respective device sections of the unit 30 on the basis of signals input from the keys 50, a display 52 for displaying a status of the telephone device, a secondary battery 53 for supplying electric power for the device operation, and a power supply 54 for generating the voltages to be supplied to the respective device sections.

A headset 60 has acoustic means, i.e., a headphone 61 and a microphone 62. A high-frequency eliminating means 63, for example, a capacitor of 100 pF is connected across the input terminals of the headphone 61 for eliminating the high-frequency components of a input signal. A wired transfer means 64 is connected between the headphone 61 and a coupling means, that is a plug 65. The wired transfer means 64 may be, for example, a paired cable of one-meter length. Similarly, a paired cable 66 is connected between the headset microphone 62 and a plug 67.

Referring to FIG. 2, the operation of the telephone device with using the headset 60 will be described below.

First, the headphone 61 is connected to the output terminal of the LPF 46, while the built-in earphone 48 is disconnected, by inserting the plug 65 into the headphone jack 47. That is, the detachable coupling means 47, 65 relays an output signal of the LPF 46 to the cable 64. Similarly, the microphone 62 is connected to the input terminal of the BPF 33, while the built-in microphone 31 is disconnected, by inserting the plug 67 into the microphone jack 32.

For the next step, a telephone call is initiated by operating the operation keys 50 by a user. During the call is in progress, the speech voice input to the microphone 62 is converted into an electric signal to be supplied to the BPF 33 through the cable 66, the plug 67 and the jack 32. The frequency components of the signal lying outside the speech band are eliminated by the BPF 33 and the analog voice signal within the band is supplied to the voice amplifier 34. The amplifier 34 amplifies the signal to a predetermined power level and supplies the amplified signal to the A/D converter 35.

The A/D converter 35 in turn samples the signal on the basis of a clock signal with a frequency of, for example, 8 kHz and then converts the sampled data into a digital signal. The digital signal is supplied to the encoder 36. The encoder 36 in turn spreads the digital signal with a spread spectrum scheme and stores the encoded signal temporarily in a buffer memory (not shown), which is provided in the encoder 36. The stored signal is supplied to the modulator 37 on the basis of a control signal of the controller 51.

The modulator 37 performs digital modulation of a carrier wave of a 800 MHz frequency band supplied from the synthesizer 49 so as to generate a digital-modulated wave. The transmit-power amplifier 38 then amplifies the digital-modulated wave to a predetermined power level. The amplified digital-modulated wave is transmitted over the antenna 40 through the diplexer 39. It should be noted that the modulated wave may be intermittently transmitted in a burst-mode during the call, which is caused by an on/off-transmit-control of the controller 51 under some conditions, for example, in the case of presence or absence of a voice signal to be transmitted or in the case of the line congestion.

On the other hand, the radio signal with a frequency of 800 MHz received by the antenna 40 is introduced to the high-frequency amplifier 41. The signal is amplified by the amplifier 41 to a predetermined power level and supplied to the frequency converter 42.

The frequency converter 42 converts the frequency of the received signal with using the local-oscillator signals supplied from the synthesizer 49 so as to select a signal of a desired frequency. Then, the selected signal is supplied to the demodulator 43. The demodulator 43 in turn extracts a signal having a predetermined timing on the basis of a timing signal of the synthesizer 49 and demodulates the signal into a baseband digital signal. The digital signal is then supplied to the D/A converter 44 for converting it into an analog voice signal. The resulted voice signal is amplified by the audio power amplifier 45 to a predetermined power level and supplied to the headphone 61 by way of the LPF 46, the jack 47, the plug 65, and the cable 64. The headphone 61 converts the signal to generate a speech sound.

As mentioned above, an intense burst radio wave with a frequency of 800 MHz may be transmitted over the antenna 40 during a phone call. The cable 64 functions as an antenna for catching the transmitted radio wave over the antenna 40 of the telephone, since the cable 64 of the headset 60 is located in the vicinity of the antenna 40 and the length of the cable 64, which is on the order of 1 meter, is shorter than the wavelength (approximately, 30 cm) of the transmitted radio wave. The radio wave caught by the cable 64 induces a high-frequency signal therein and the induced signal is transferred to both directions of the cable 64, i.e., to the directions of the headphone 61 and the telephone unit 30.

The induced signal transferred to the direction of the headphone 61 can be almost completely eliminated by the 100 pF bypass capacitor 63, which is connected across the input terminals of the headphone 61, since the capacitor 63 has an impedance of approximately 2 ohms in 800 MHz band. Thus, an occurrence of noise due to the burst signal in the headphone 61 can be prevented.

On the other hand, the LPF 46 is provided between the audio amplifier 45 and the jack 47. Therefore, the induced signal of 800 MHz transferred to the direction of the telephone unit 30 is forced to pass through directly to a ground level GND by the capacitor 46b in the LPF 46. Thus, an occurrence of noise due to the entry of the burst signal into the amplifier 45 can be prevented.

As described above, the portable-telephone device of the first embodiment according to the present invention includes the LPF 46 and the capacitor 63. The LPF 46 prevents the entry of the high-frequency burst signal into the amplifier 45 and the capacitor 63 that is connected across the input terminals of the headphone 61 forces the burst signal to bypass the headphone 61. Therefore, the occurrence of noise in the headphone 61 can be prevented.

Second Embodiment

Figure 3:
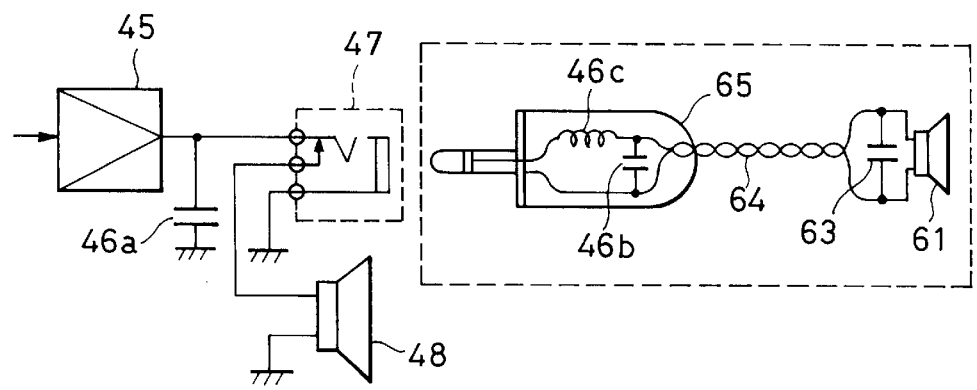
FIG. 3 is a block diagram illustrating the configuration of an electric circuit of a headset and an analog-voice output circuit of a telephone unit of a second embodiment according to the present invention.

FIG. 3 illustrates the configuration of an electric circuit of a headset and an analog voice output circuit of a telephone unit of the second embodiment according to the invention. It should be noted that in FIG. 3, elements identical or corresponding to those in the aforementioned portable-telephone device of the first embodiment illustrated in FIG. 2 are designated the same reference numerals.

Unlike the first embodiment, the capacitor 46b and the inductor 46c, which constitute the LPF 46 in the first embodiment, are placed separately from the capacitor 46a. That is, the capacitor 46a is connected between the output terminal of the audio amplifier 45 and the ground level GND, while the capacitor 46b and the inductor 46c are placed in the plug 65. The capacitor 46b is connected in parallel with a paired cable 64 and the inductor 46c is connected in series with the cable 64. The remaining aspects of the second embodiment are similar to those of the first embodiment.

The second embodiment also has an advantage of preventing the noise occurrence in the headphone 61. More specifically, the capacitor 46a, the capacitor 46b and the inductor 46c prevent the entry of the high-frequency burst signal into the amplifier 45 and the capacitor 63 forces the burst signal to bypass the headphone 61.

Third Embodiment

Figure 4:
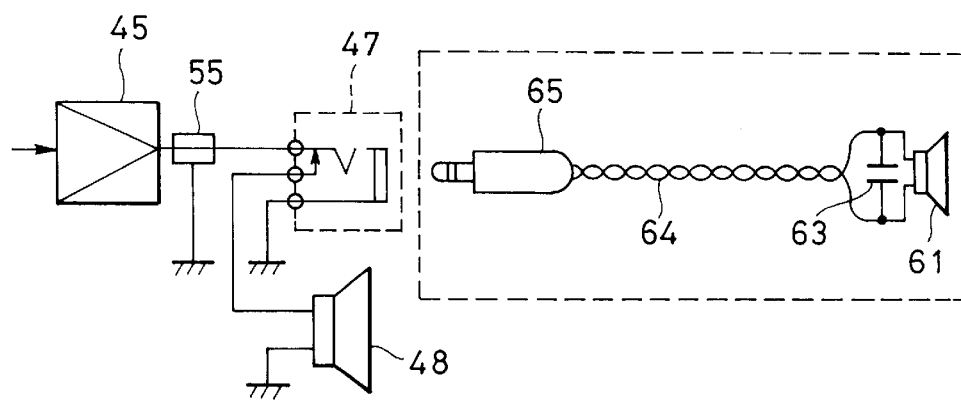
FIG. 4 is a block diagram illustrating a circuit of a headset and a analog-voice output circuit of a telephone unit of a third embodiment according to the present invention.

FIG. 4 illustrates the configuration of an electric circuit of a headset and an analog-voice output circuit of a telephone unit of the third embodiment according to the invention. It should be noted that in FIG. 4, elements identical or corresponding to those in the aforementioned portable-telephone device of the first embodiment illustrated in FIG. 2 are designated the same reference numerals.

According to the third embodiment, the LPF 46 in the first embodiment is replaced by a bead core 55. The bead core 55 is made of a magnetic material such as a ferrite and is shaped like a bead. The bead core 55 blocks a passage of a high-frequency signal through a conductor when the conductor is drawn in a through-hole bored at the center of the bead. As illustrated in FIG. 4, the output terminal of the audio amplifier 45 and a terminal of the jack 47 are interconnected via the through-hole of the bead core 55. The remaining aspects of the third embodiment are similar to those of the first embodiment.

The third embodiment also has an advantage similar to that of the first embodiment. More specifically, the bead core 55 blocks a transfer of the high-frequency burst signal, which is induced in the cable 64, to the audio amplifier 45. Thus, the noise occurrence in the headphone 61 is prevented.

Furthermore, the third embodiment has an advantage of simplifying the configuration of the electric circuit.

Fourth Embodiment

Figure 5:
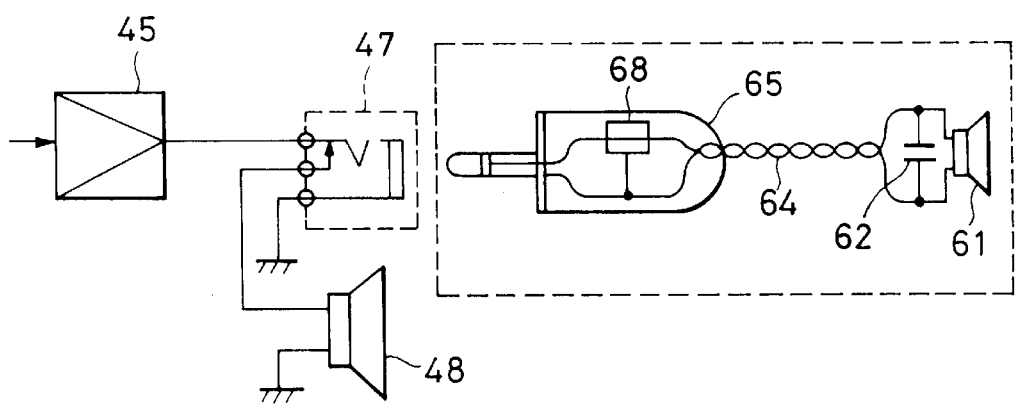
FIG. 5 is a block diagram illustrating a circuit of a headset and a analog-voice output circuit of a telephone unit of a fourth embodiment according to the present invention.

FIG. 5 illustrates the configuration of an electric circuit of a headset and an analog-voice output circuit of a telephone unit of the fourth embodiment according to the invention. It should be noted that in FIG. 5, elements identical or corresponding to those in the aforementioned portable-telephone device of the third embodiment illustrated in FIG. 4 are designated the same reference numerals.

Unlike the third embodiment, the bead core 55 is located in the plug 65 of the headset 60. The remaining aspects of the fourth embodiment are similar to those of the third embodiment.

The principle of preventing a noise occurrence in the fourth embodiment is similar to that of the third embodiment. Also the fourth embodiment has an advantage of simplifying the configuration of the electric circuit. Still further, the high-frequency eliminating means such as an LPF is not needed in the telephone unit 30, while the noise elimination can be realized by providing a high-frequency eliminating means only in the headphone 61. Thus, the configuration of the telephone unit 30 can be simplified in this embodiment It should be understood that the teaching of this invention is not limited to the aforementioned embodiments and that various other modifications can be made.

While the respective embodiments described above illustrate applications of the present invention to a portable-telephone device, the present invention can be applied to any kind of transceivers that employ burst signals.

While the embodiments described above have referred to a portable-telephone device using a radio wave of 800 MHz frequency, the present invention can be applied to transceivers using the other frequency bands, for example, 1.9 GHz.

While the embodiments described above have referred to a portable-telephone device using a headset that includes a headphone and a microphone, the present invention can be applied to a headset having only a microphone.

While, further, in the embodiments described above, the headset includes two respective plugs for transmission and reception, a headset having only one plug of dual-purpose may be utilized.

Furthermore, the teaching of this invention is not limited to use of the π-shaped LPF, other types of filter can be employed.

Being apparent from the above, the present invention provides, in a first aspect, a first eliminating means for eliminating a high-frequency signal induced in the transfer means is provided between the receiving means and the coupling means, and a second eliminating means for eliminating a high-frequency signal is provided between the receiving means in the acoustic means. The entry of the high-frequency signal into the receiving means and the acoustic means can be avoided. Therefore, the occurrence of noise in the headphone can be prevented.

Further, the present invention provides, in a second aspect, a first and a second eliminating means for eliminating a high-frequency signal induced in the transfer means are provided at the respective ends of the transfer means. Therefore, the occurrence of noise in the headphone can be prevented. Further, the configuration of the receiving means and the transmitting means can be simplified.

Still further, the present invention provides, in a third aspect, a first eliminating means for eliminating a high-frequency signal includes at least one of capacitor, and a second eliminating means includes at least one of capacitor. Therefore, the occurrence of noise in the headphone can be prevented with a simplified configuration.

Furthermore, the present invention provides, in a fourth aspect, a first eliminating means for eliminating a high-frequency signal includes at least one of magnetic bead core, and a second eliminating means includes at least one of capacitor. Therefore, the occurrence of noise in the headphone can be prevented with a simplified configuration.

While the invention has been particularly shown and described with respect to the preferred embodiments thereof, it should be understood by those skilled in the art that various other modifications may be made to the illustrated embodiments without departing from the scope and the spirit of the invention as described in the specification and defined in the appended claims.

What is claimed is:

1. A digital wireless transceiver apparatus, comprising:

transmitting means for converting a voice signal into a digital signal to store the converted signal and for modulating a carrier wave with spread spectrum codes of the stored signal, said transmitting means being operable for transmitting the modulating signal in an intermittent mode;

receiving means for receiving a spread radio signal for demodulating the received signal to obtain a voice signal;

acoustic means for converting the voice signal into acoustic sound; and transfer means for transferring said voice signal to said acoustic means through a cable;

wherein said transfer means includes:

a first high-frequency eliminating means for preventing a high-frequency signal induces into said transfer means by said transmitted signal from arriving at said acoustic means;

a second high-frequency eliminating means for preventing said high frequency signal from arriving at said receiving means; and a detachable coupler for relaying said voice signal between said receiving means and a paired cable interconnecting said coupler and said acoustic means, said second high-frequency eliminating means being provided between said coupler and said paired cable.

2. A digital wireless transceiver apparatus according to claim 1, wherein said first and said second high-frequency eliminating means are LPF's.

3. A digital wireless transceiver apparatus according to claim 1, wherein either said first or said second high-frequency eliminating means includes a magnetic bead core.

* * * * *